United States Patent Office 3,185,035
Patented May 25, 1965

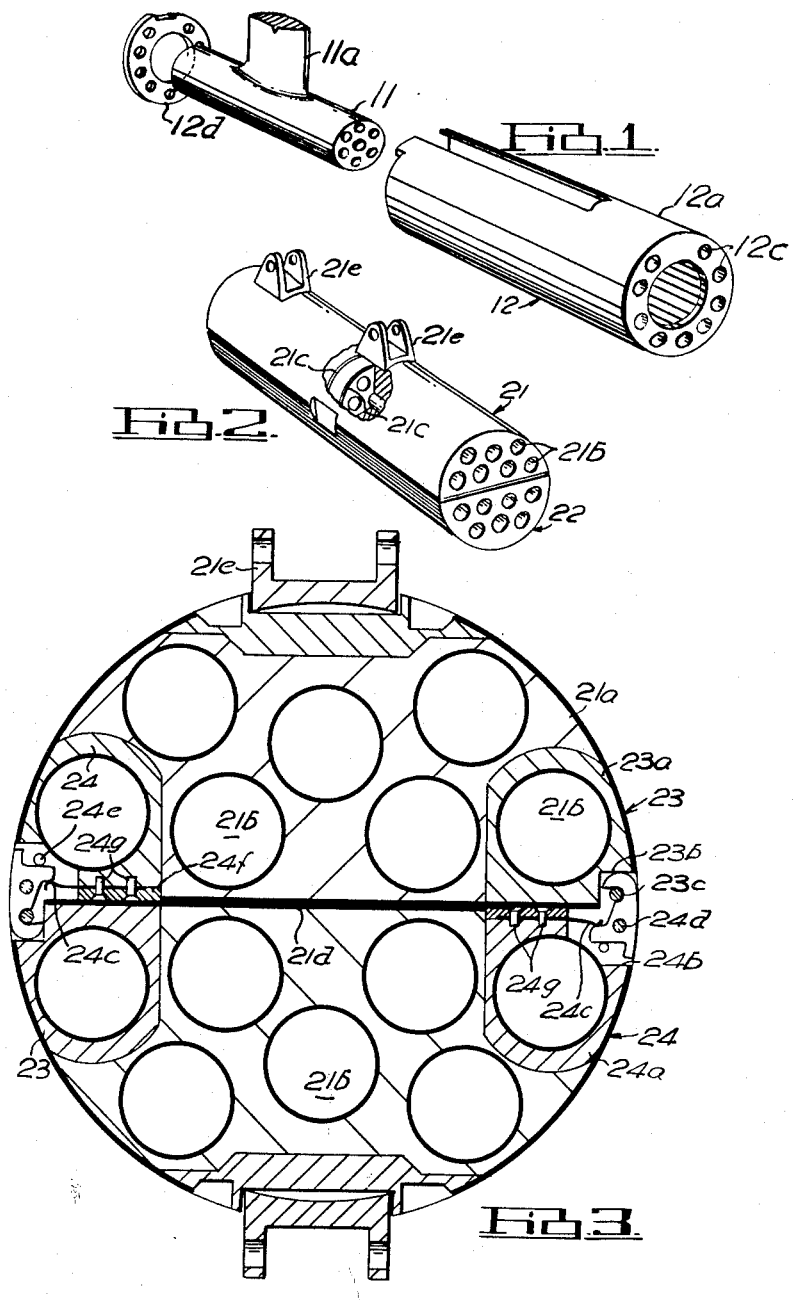

3,185,035
ROCKET LAUNCHERS
Eric William Gregory-Humphries, Old Knebworth, England, assignor to Thomas French & Sons Limited, a British company
Filed May 29, 1962, Ser. No. 198,615
Claims priority, application Great Britain, May 31, 1961, 19,600/61
6 Claims. (Cl. 89—1.7)

The invention concerns rocket launchers and in particular relates to such launchers as are slung beneath the wings or fuselage of aircraft.

It is usual to suspend one or more rocket launchers beneath an aircraft, either from the wings or fuselage, such launchers each taking the form of a substantially cylindrical body secured to an appropriate part of the aircraft by a mounting pylon and being adapted to receive and fire a plurality of individual rockets.

It has been found in practice that the maximum number of rockets which may be carried by an aircraft is primarily determined, in many instances by the required operational range of the aircraft. Thus for a long range operation, where excessive fuel supplies must be carried, the number of rockets will be at a minimum whereas for short range operations with low fuel requirements a larger number of rockets may be carried.

It is among the objects of the present invention to provide an arrangement whereby the rocket carrying capabilities of an aircraft, whether of fixed or rotary wing type, may be varied to suit particular operational requirements.

Thus according to the present invention there is provided a supplementary launcher adapted to be releasably applied to a fixed rocket launcher in such manner as to form, with such fixed launcher, a composite launcher capable of carrying a greater complement of projectiles.

In one embodiment the supplementary launcher comprises a sleeve-like member adapted for mounting in coaxial relationship with a fixed launcher, said sleeve-like member being adapted to receive rockets disposed longitudinally thereof and having means whereby the rockets so carried may be discharged as required.

The invention will now be described further, by way of example only, with reference to the accompanying drawings illustrating two particular embodiments thereof and in which:

FIGURE 1 shows an exploded perspective view of a rocket launcher assembly constructed in accordance with the present invention;

FIGURE 2 shows a perspective view, partly cut-away; of an alternative assembly; and FIGURE 3 is a transverse section taken through an assembly corresponding to that shown in FIG. 2.

Referring now to the drawings and in particular to FIG. 1 thereof, a standard rocket launcher 11 of substantially cylindrical form is suspended beneath the wing of an aircraft (not shown) by a single mounting pylon 11a, being directed radially outwardly of the launcher and being secured to the wing main strut from below. The pylon is aerodynamically shaped when viewed in frontal aspect and is disposed approximately centrally of the launcher.

To said standard launcher 11 is applied a supplementary launcher 12 comprising a sleeve-like member 12a, of an internal diameter which is clearance on the body of the standard launcher, the said member 12a having a longitudinal slot 12b in the upper part such that the member may be slid fully into position upon the existing launcher, the said slot 12b being so dimensioned as to receive the pylon 11 into engagement therewith.

The width of the annular cross-section of the sleeve-like member 12a is selected to meet particular requirements although it is envisaged that the dimension will be such that a single ring of rockets may be carried in tubes 12c equally spaced about the annulus.

A locking plate, 12d, which serves two-fold purposes of holding the supplementary launcher 12 in position relative to the pylon, and also projectiles (not shown) in position within the launcher, and is applied to the rear of the supplementary launcher 12 and such plate 12d, may be adapted, if required, to provide electrical contacts between the projectiles and the rocket firing mechanism. The plate 12d, may be positioned by any convenient means, such means being of conventional form and thus not being illustrated nor being discussed in detail. For example, it may engage lugs at one point and then be locked by a spring loaded clip located in a position diametrically opposed to the lugs. In many instances it may be found convenient to arrange that the locking plate of the supplementary launcher serves to provide a retaining means for the rockets of the standard launcher and also to provide electrical contacts for such launcher.

It is thought that by means of the supplementary launcher constructed in accordance with the invention the full complement of a launcher may be at least doubled and the total fire power of the aircraft similarly increased. For example, for a standard launcher of seven projectiles, the supplementary launcher may carry a further ten projectiles.

In a preferred embodiment, see now FIG. 2, the full launcher assembly comprises two similar half cylindrical launchers 21, 22 secured together and suspended from an aircraft.

The two launchers are of identical construction, the one, that is to say the supplementary launcher 22, being inverted relative to the other, the standard launcher 21, and thus one only will be discussed in detail.

Thus the launcher comprises a half-cylindrical shell 21a having disposed longitudinally thereof a multiplicity of tubes 21b, the tubes 21b being located by pairs of spaced plates 21c. The volume between the individual plates of each pair is filled with a foamed plastic material and the shell 21a is closed by a plate 21d lying in the diametrical plane thereof. Two lugs 21e are provided which extend radially outwardly from the launcher, such lugs 21e being adapted to be secured to corresponding formations (not shown), upon which the aircraft thus to suspend the launcher thereupon, the lugs 21e corresponding to the location of the plates 21c. At spaced intervals along the length of the launcher, again in axial positions corresponding to the lugs 21e, attached clip assemblies 23, 24 are provided such assemblies being located at diametrically opposite sides of the launcher and being adapted to co-act with the corresponding assemblies on a like launcher as will later become apparent. The attachment clip assembly 23 comprises a rigid block 23a of limited axial extent relative to the launcher, such length corresponding to the spacing between the individual plates of a pair of plates 21c which is secured to the shell 21a and corresponding plate 21d and which has a projectile tube 21b passing therethrough, the said block having a recess 23b therein and within which is located a pin 23c, such pin being directed longitudinally of the launcher. The attachment clip assembly 23 likewise includes a rigid block 24a between associated plates 21c of a pair and again a recess 24b is provided therein. Within the recess 24b is pivotally mounted an attachment hook 24c the said hook 24c being capable of pivotal motion about a pin 24d the axis of such pin being parallel to the longitudinal axis of the launcher. A stop 24c is pivoted within the recess 24b and is located in parallel spaced relationship with regard to the pin 24d the position of the stop 24c and the dimensions of the hook 24c being such that in the operative position the latter bears upon the former. A leaf spring 24f secured to the block 24a by screws 24g bears against the hook 24c to urge the said hook against the stop when in the operative position, but also serves to hold the said hook in an unoperative position when required, the said hook having a flat 24e against which the spring bears in such latter contingency.

In normal circumstances, when a medium or maximum operational range of the aircraft is required, one or more launcher assemblies are provided, each such assembly comprising a launcher 21 of D-shaped cross-section.

When, however, a greater fire power is desirable and is permitted by virtue of a shorter required operation range then some or all of the launcher assemblies are augmented by the addition thereto of a supplemnetary launcher 22, the said supplementary launcher 22 being attached to the standard launcher 21 by the interengagement of the corresponding attachment clip assemblies 23, 24 of the individual launchers, the assemblies 23 of one such launcher enjoying the assemblies 24 of the supplementary launcher and vice versa.

The securing together of the two launchers may be augmented by the provision of locking bolts on one of the launchers, such bolts being spring loaded and adapted to engage correspondingly with the lugs on the other launcher.

A back plate will be applied to the composite launchers and will serve to carry lead wires for the projectile firing mechanism if required.

The invention is not restricted to the specific features of the embodiment before described since alternatives will readily present themselves to one skilled in the art. For example, the sleeve-like member may carry a double ring of projectiles, the slot in the upper part of the member may extend over the full length thereof or alternatively may be so disposed that the supplementary launcher is applied to a standard launcher, not from in front but from behind. Again, the manner in which the rockets are fed may be varied to suit particular requirements.

It is also to be understood that the supplementary launcher may be other than of the cylindrical sleeve-like construction described since many other forms may be used with equal advantage. For instance, if the basic launcher were of hexagonal cross section a supplementary launcher of complementary form would be used.

I claim:

1. A rocket launcher comprising an elongated semi-cylindrical first launcher having a flat face, a nest of tubes in said first launcher, a recess in said launcher at one end of said flat face, a first hook pivoted in said recess and extending beyond said face, a recess at the other end of said flat face, a first pin in said other end extending longitudinally and adapted to receive a second hook, an elongated semi-cylindrical second similar launcher, having a second flat face adapted to fit against said first flat face, a recess in said second launcher at said other end of said second flat face, a second hook pivoted in said second face and extending beyond said second face and engaging said first pin, a second pin in said first end of said second face extending longitudinally and adapted to receive said first hook, said launchers together constituting a cylinder.

2. A launcher as claimed in claim 1 wherein the first launcher and said second launcher are of identical construction.

3. A launcher as claimed in claim 2 wherein the said first and second launchers are of substantially D-shaped cross-section.

4. A launcher as claimed in claim 3, wherein said hooks are spring-biased towards their respective pins.

5. A rocket launcher comprising, a fixed launcher having a nest of longitudinal tubes and being attached to an aircraft, said fixed launcher being of substantially D-shape in cross section and having an arcuate and a flat face, said flat face being provided at one side with a spring-biased hook member and provided with a pin at its opposite side, a second launcher adapted for detachable fitment onto and below the fixed launcher, the second launcher being shaped similarly to the first launcher and having a nest of longitudinal tubes and being positioned with its flat face in contact with the similar face on the fixed launcher, the second launcher having a spring-biased hook and pin similar to those of the fixed launcher, the hook on the second launcher engaging with the pin on the fixed launcher, and the hook on the fixed launcher engaging with the pin on the second launcher to thereby hold the two launchers together.

6. A rocket launcher comprising an elongated cylindrical first launcher having a nest of tubes in the body thereof, a stream-lined pylon extending radially therefrom, a second elongated annular multi-tube launching sleeve, the tubes in said second launching sleeve being arranged in a circle, the inner diameter of said sleeve being sufficient to permit the entrance of said first launcher, a longitudinal slot in the wall of said second launcher beginning at one end and extending part-way thru the length thereof, the dimensions of said slot being such that said pylon fits into said slot, said first launcher being fitted into and concentric with said second launcher, said pylon extending radially beyond said second launcher, and an annular plate on said one end of said second launcher and secured thereto, whereby the launchers are held against relative displacement.

References Cited by the Examiner

UNITED STATES PATENTS

| | | | |
|---|---|---|---|
| 1,255,772 | 2/18 | Miller | 206—47 |
| 2,470,432 | 5/49 | Cusick | 220—23.4 |
| 2,542,397 | 2/51 | Core | 206—47 |
| 2,609,730 | 9/52 | Bergstrom | 89—1.7 |
| 2,787,938 | 4/57 | Bach | 89—1.7 |
| 2,792,754 | 5/57 | Walker | 89—1.7 |
| 2,792,962 | 5/57 | Granfelt | 206—65 X |
| 2,802,398 | 8/57 | Beach | 89—1.7 |
| 2,825,085 | 3/58 | Ingraham | 220—23.4 X |
| 2,844,073 | 7/58 | Re et al. | 89—1.7 |
| 2,925,100 | 2/60 | Senger | 206—17 X |
| 2,961,927 | 11/60 | Dufour | 89—1.7 |

BENJAMIN A. BORCHELT, *Primary Examiner.*